United States Patent
Ohtsu et al.

(10) Patent No.: US 6,720,119 B2
(45) Date of Patent: Apr. 13, 2004

(54) METHOD OF FABRICATING HIGH-DIELECTRIC COLOR FILTER

(75) Inventors: Shigemi Ohtsu, Nakai-machi (JP); Yoshinori Yamaguchi, Nakai-machi (JP); Keishi Shimizu, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 117 days.

(21) Appl. No.: 09/880,131

(22) Filed: Jun. 14, 2001

(65) Prior Publication Data

US 2002/0012856 A1 Jan. 31, 2002

(30) Foreign Application Priority Data

Jul. 27, 2000 (JP) .................................... 2000-227721
Jul. 27, 2000 (JP) .................................... 2000-227722
Nov. 16, 2000 (JP) .................................... 2000-349605

(51) Int. Cl.$^7$ .......................... G02B 5/20; G03F 1/1335
(52) U.S. Cl. ........................................... 430/7; 205/91
(58) Field of Search ............................... 430/7; 205/91

(56) References Cited

U.S. PATENT DOCUMENTS 6,436,591 B1 * 8/2002 Ohtsu et al. .................... 430/7

FOREIGN PATENT DOCUMENTS

| JP | B2 2-60164 | 12/1990 |
| JP | A 5-5874 | 1/1993 |
| JP | A 7-333595 | 12/1995 |
| JP | A 10-119414 | 5/1998 |
| JP | A 10-193769 | 7/1998 |
| JP | A 11-105418 | 4/1999 |
| JP | A 11-133224 | 5/1999 |
| JP | A 11-174790 | 7/1999 |
| JP | A 11-189899 | 7/1999 |

* cited by examiner

Primary Examiner—John A. McPherson
(74) Attorney, Agent, or Firm—Oliff & Berridge, PLC

(57) ABSTRACT

A method of fabricating a color filter with a small number of processes and at low cost is provided, for which a transparent conductive film for liquid crystal driving need not be formed, a voltage drop during liquid crystal driving is restrained, and a black matrix is easily formed; an apparatus for fabricating the color filter; the color filter; and a liquid crystal display apparatus. A color filter forming substrate on which a transparent conductive film and a transparent thin semiconductor film are provided on a transparent substrate in this order is brought into contact with an aqueous electrodeposition liquid, which contains a colorant, a transparent, high-dielectric material having a particle diameter of 100 nm or less, and a polymeric material that has cross-linkable groups in molecules and decreases in solubility and dispersibility for an aqueous liquid, depending on a change in pH, photoelectromotive force is produced by irradiating selected regions with light to form colored films in the selected regions, and thereby, a solvent-resistant and high-dielectric color filter is fabricated. Also, a color filter in which solvent-resistant and high-dielectric colored films are formed is provided.

34 Claims, 5 Drawing Sheets

METHOD OF FABRICATING HIGH-DIELECTRIC COLOR FILTER

BACKGROUND OF THE INVENTION

1. Field of the Invention

The present invention relates to a technology for forming a color filter used in various kinds of display elements and color sensors such as a CCD (charge coupled device) camera and a liquid crystal display element, and more particularly to a method of fabricating a colored layer and a black matrix. Specifically, the present invention relates to a new color filter in which the colored layer and the black matrix are formed simply and with high resolution.

2. Description of the Prior Art

Presently, as color filter fabricating methods, the following are known: (1) dying method, (2) pigment dispersion method, (3) printing method, (4) ink jet method, (5) electrodeposition method, and (6) micelle electrolysis method. Of these methods, although the (1) dying method and the (2) pigment dispersion method are high in technical completion level and are often used for color solid state imaging elements (CCD), because of the need for patterning through a photolithography process, they are problematic in terms of the large number of processes and a high cost.

In contrast, although the (3) printing method and the (4) ink jet method do not require the photolithography process, the (3) printing method, which prints thermosetting resins in which pigments are dispersed for hardening, is inferior in terms of resolution and the uniformity of film thickness. The (4) ink jet method forms a specific ink receiving layer, carries out hydrophilicity and hydrophobicity processing, and then sprays ink into produced hydrophilic portions to obtain color filter layers. This method is problematic in terms of resolution, the tendency to cause color mixing in adjacent filter layers, and position precision.

A color filter produced by each of the above-mentioned methods is generally formed on the side of an ITO substrate that opposes a TFT substrate. However, if the filter is formed in that location, after a liquid crystal is encapsulated, the TFT substrate and a color filter substrate must be aligned. This involves difficulty to obtain high precision, causing a rise in cost.

The (5) electrodeposition method, in an electrolytic solution in which pigments are dispersed in water-soluble polymers, applies the high voltage of about 70 V to a transparent electrode patterned beforehand to form electrodeposition film for electrodeposition coating. By repeating this process three times, red, green, and blue color filter layers are obtained of R.G.B. This method is disadvantageous in that, since the transparent electrode must be patterned beforehand by photolithography for use as an electrodeposition electrode, it cannot be used for TFT liquid crystals because of the limited pattern shapes. Also, although patterning need not be performed if a color filter cannot be formed integrally with pixel electrodes of a TFT liquid crystal substrate by electrodeposition, with conventional electrodeposition methods, electrodeposition by use of TFT pixel electrodes has been impossible, because of the high electrodeposition voltage and the difficulty of causing electrodeposition in transparent pixel electrodes by an active matrix circuit. Also, the TFT pixel electrodes cannot be used for the reason that a liquid crystal voltage increases because a color filter layer becomes insulative, and other reasons.

Therefore, it is necessary to additionally provide a conductive film as a liquid crystal driving electrode on colored films of a color filter, causing an increase in the number of processes and a rise in cost. Especially, a TFT integrated color filter requires the complicated process of forming a through-hole between a conductive film and TFT pixel electrodes on colored films.

A color filter fabricating method is disclosed in Japanese Published Unexamined Patent Application No. Hei 7-333595. According to this method, a color filter transfer substrate on which an adhesive layer containing a ferroelectric substance as well as a color filter layer containing a ferroelectric substance such as barium titanate, etc., are provided on a transfer substrate is mounted on a TFT liquid crystal display substrate after alignment, and the color filter layer is transferred together with the adhesive layer. By containing a ferroelectric substance in the color filter layer and the adhesive layer, the capacitance of both layers is increased and a voltage drop is restrained. However, this method requires the very complicated process of fabricating in advance a color filter transfer substrate on which a color filter layer and an adhesive layer are provided on a transfer substrate, and transferring it after alignment with a TFT liquid crystal display substrate. Also, this method involves many processes and is unsuitable for fabrication of a high-resolution TFT integrated color filter at low cost. Furthermore, the official bulletin does not describe at all how the color filter layer containing a ferroelectric substance is formed on the transfer substrate.

Also, a color filter of a simple matrix style type crystal display apparatus is disclosed in Japanese Published Unexamined Patent Application No. Hei 2-60164. The color filter is reduced in the electric impedance of a color filter layer on which colored films containing high-dielectric material particles are deposited from an electrodeposition liquid containing electrodeposition high polymers, pigments, the high-dielectric material particles.

By the way, in a liquid crystal display apparatus, an orientation film such as polyimide formed on a color filter layer is usually formed by applying an orientation film resin dissolved in an organic solvent onto the color filter layer. However, generally, since the color filter layer does not have solvent resistance, if a resin solution is applied directly onto the color filter layer, the color filter layer will be dissolved by the organic solvent. Therefore, usually, an orientation film is formed before applying a solution of orientation film resin and after providing a protective film made of polymeric materials thermally cross-linked and improved in solvent resistance provided on the color filter layer.

However, since the protective film generally has a low dielectric constant, it must be avoided to form the protective film on a high-dielectric color filter as mentioned above.

Also, there is a problem in that, if high-dielectric material particles are contained in the color filter layer, light transparency decreases. It is described in Japanese Published Unexamined Patent Application No. Hei 5-5874 that a color filter is provided on ITO electrodes on a TFT substrate by the electrodeposition method.

Therefore, when a TFT integrated color filter is considered including R, G, and B layers and a black matrix, there is not yet provided a method of fabricating a TFT integrated color filter which has high resolution and excellent color purity, is high in terms of controllability, has high transparency, requires no use or a minimum amount of use of photolithography, does not require the formation of through-holes and conductive films, has high yields, and is inexpensive.

SUMMARY OF THE INVENTION

The present invention has been made in view of the abovementioned problems, and provides a method of fabricating a color filter, with a small number of processes and at low cost, for which a transparent conductive film for liquid crystal driving need not be formed, a voltage drop during liquid crystal driving is restrained, and a black matrix is easily formed; an apparatus for fabricating the color filter; the color filter, and a liquid crystal display apparatus.

A color filter fabricating method according to an aspect of the present invention includes the steps of: placing a color filter forming substrate formed by providing a transparent conductive film and a transparent thin semiconductor film on a transparent substrate in this order so that at least the thin semiconductor film of the color filter forming substrate contacts an aqueous electrodeposition liquid which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; in this state, irradiating a selected region of the thin semiconductor film with light to apply a voltage between the thin semiconductor film of the selected region and an opposing electrode; and depositing a high-dielectric colored film in the selected region of the thin semiconductor film.

A color filter fabricating method according to another aspect of the present invention includes the steps of: placing a color filter forming substrate formed by arraying thin film transistors and transparent conductive films on a transparent substrate and providing thin semiconductor films on the conductive films so that at least the thin semiconductor films of the color filter forming substrate contact an aqueous electrodeposition liquid which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; in this state, irradiating a thin semiconductor film of a selected region with light to apply a voltage between the thin semiconductor film and an opposing electrode; and depositing a high-dielectric colored film in the thin semiconductor film of the selected region.

A color filter fabricating method according to another aspect of the present invention includes the steps of: placing a color filter forming substrate formed by providing a transparent conductive thin film and a transparent thin semiconductor film in contact with the conductive film on a transparent substrate, the conductive film being conductible to an electrolyte so that the thin semiconductor film contacts an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; bringing the conductive film into conduction with the electrolyte; in this state, irradiating a selected region of the thin semiconductor film with light; and depositing a high-dielectric colored film in the thin semiconductor film of the selected region.

A color filter fabricating method according to another aspect of the present invention includes the steps of: placing a color filter forming substrate formed by arraying thin film transistors and transparent conductive films on a transparent substrate and providing transparent thin semiconductor films in contact with the conductive films so that a part of the conductive film is exposed so that at least the conductive films and the thin semiconductor films contact an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; irradiating the thin semiconductor film of a selected region with light; and depositing a high-dielectric colored film in the thin semiconductor film of the selected region.

A color filter fabricating method according to another aspect of the present invention includes the steps of: placing a color filter forming substrate formed by arraying thin film transistors and transparent conductive films on a transparent substrate and transparent thin semiconductor films in contact with the conductive films so that a part of the conductive films is exposed so that at least the conductive films and the thin semiconductor films contact an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; selectively driving a predetermined thin film transistor; in this state, irradiating the entire surface of the color filter forming substrate with light; and depositing a high-dielectric colored film in a thin semiconductor film corresponding to a thin film transistor not driven.

A color filter according to another aspect of the present invention includes: a color filter forming substrate formed by providing at least a transparent conductive film and the transparent thin semiconductor film on a transparent substrate in this order; solvent-resistant colored films having a relative dielectric constant of 4.0 or more provided on the thin semiconductor film; and an insulative, low-dielectric black matrix.

A color filter fabricating apparatus according to another aspect of the present invention includes: a light source for applying light; an imaging optical system having a first imaging optical lens and a second imaging optical lens; a photomask inserted between the first imaging optical lens and the second imaging optical lens; an opposing electrode; a unit capable of applying a bias voltage; an electrodeposition cell storing an electrodeposition liquid; and a color filter forming substrate formed by providing at least a transparent conductive film and the transparent thin semiconductor film on a transparent substrate. The color filter forming substrate is placed in the electrodeposition cell so that at least the conductive film and the thin semiconductor film contact the electrodeposition liquid.

A color filter fabricating apparatus according to another aspect of the present invention includes: a light source for applying light; an imaging optical system having a first imaging optical lens and a second imaging optical lens; a photomask inserted between the first imaging optical lens and the second imaging optical lens; an electrolytic cell storing an electrolyte; and a color filter forming substrate formed by providing at least a transparent conductive film and the transparent thin semiconductor film on a transparent substrate. The color filter forming substrate is placed in the electrolytic cell so that at least the conductive film and the thin semiconductor film contact the electrolyte.

A color filter fabricating method according to another aspect of the present invention includes: placing a color filter forming substrate formed by providing a transparent conductive film and a transparent thin semiconductor film on a transparent substrate in this order so that at least the thin semiconductor film of the color filter forming substrate contacts an aqueous electrodeposition liquid which contains a colorant, a transparent, high-dielectric material having a particle diameter of 100 nm or less, and a polymeric material that has cross-linkable groups in molecules and decreases in solubility and dispersibility for an aqueous liquid, depending on a change in pH; in this state, irradiating a selected region of the thin semiconductor film with light to apply a voltage between the thin semiconductor film of the selected region and an opposing electrode; and depositing a high-dielectric colored film in the selected region of the thin semiconductor film.

BRIEF DESCRIPTION OF THE DRAWINGS

Preferred embodiments of the present invention will be described in detail based on the followings, wherein:

FIG. 2 is a schematic view showing the section structure of a liquid crystal display apparatus equipped with a conventional color filter and a color filter of the present invention.

DESCRIPTION OF THE PREFERRED EMBODIMENTS

Figure 1:
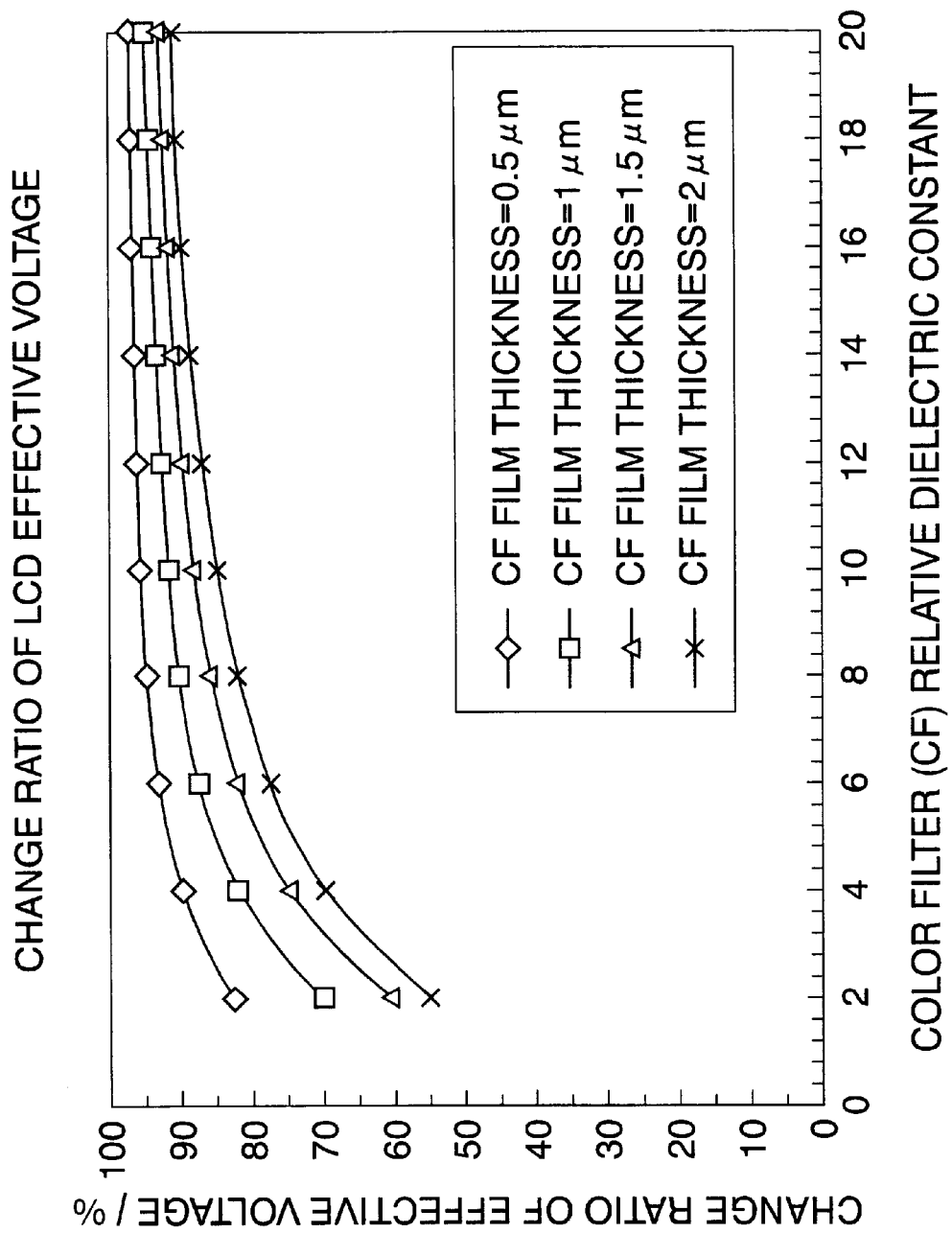
FIG. 1 is a graph showing the relationship between relative dielectric constants and effective voltages of a color filter of the present invention.

A method for fabricating a color filter of the present invention deposits and forms, on a thin semiconductor film of a color filter forming substrate on which at least a transparent conductive film and a thin semiconductor film are provided on a transparent substrate, a colored film that contains a colorant, a high-dielectric material and a polymeric material, and has a high dielectric constant and excellent solvent resistance, from an aqueous electrodeposition liquid or electrolyte by an optical electrodeposition method or photocatalyst method described later, wherein the aqueous electrodeposition liquid or electrolyte contains the colorant, a transparent, high-dielectric material having a particle diameter of 100 nm or less, and a polymeric material (hereinafter referred to as cross-linkable polymeric material) that has cross-linkable groups in molecules and decreases in solubility and dispersibility for an aqueous liquid, depending on a change in pH.

Since an electrodeposition film produced by an ordinary electrodeposition technique has insulation characteristics, in the case where a color filter layer is produced on a conductive film (electrode) for liquid crystal driving, a liquid crystal driving voltage rises, so that the electrodeposition film cannot be used. However, since the liquid crystal is usually driven using a pulse, if the dielectric constant of the color filter layer is high, it is possible to drive the liquid crystal through the color filter layer. However, since an ordinary color filter layer has a low dielectric constant, the conductive film cannot be used to drive the liquid crystal. On the other hand, according to the method of the present invention, a color filter layer of a high dielectric constant can be formed, and the composition that is made up of the polymeric material, high-dielectric material, pigment, and the like in the electrodeposition liquid is almost the same as that of the color filter layer produced. Therefore, a dielectric constant can be freely controlled by adjusting the quantity of the transparent, high-dielectric material.

To use the conductive film for liquid crystal driving also in the color filter of the present invention, it is desirable that the relative dielectric constant of the colored film is 4.0 or more.

Also, the colored film of the present invention, which cross-links cross-linkable polymeric materials, is resistant to solvents used at the time of orientation film formation, such as acetone, isopropyl alcohol (IPA) and n-methyl pyrrolidone (NMP). Therefore, even if an orientation film is formed on top of the colored film by using these solvents, the colored film never dissolves or transform. Therefore, in the color filter of the present invention, an orientation film can be formed without providing a protective film. A protective film generally has a low dielectric constant, and therefore a high dielectric constant of the colored film would be canceled by the protective film. However, in the present invention, since a protective film need not be provided, the high dielectric constant of the colored film can be kept and a conductive film (electrode) used when the colored film is formed can be used as an electrode for driving liquid crystal.

Herein, a description will be made of a drop in effective voltage when a voltage is applied to a liquid crystal in a color filter of the present invention and a liquid crystal display apparatus that employs a conventional color filter.

Figure 2A:
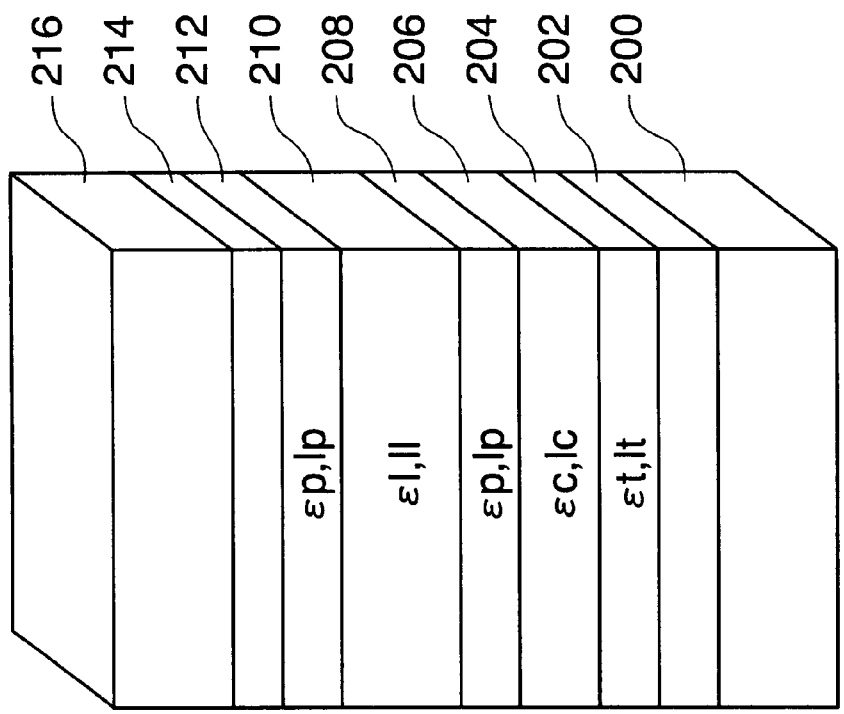
FIG. 2A; a conventional color filter.
Figure 2B:
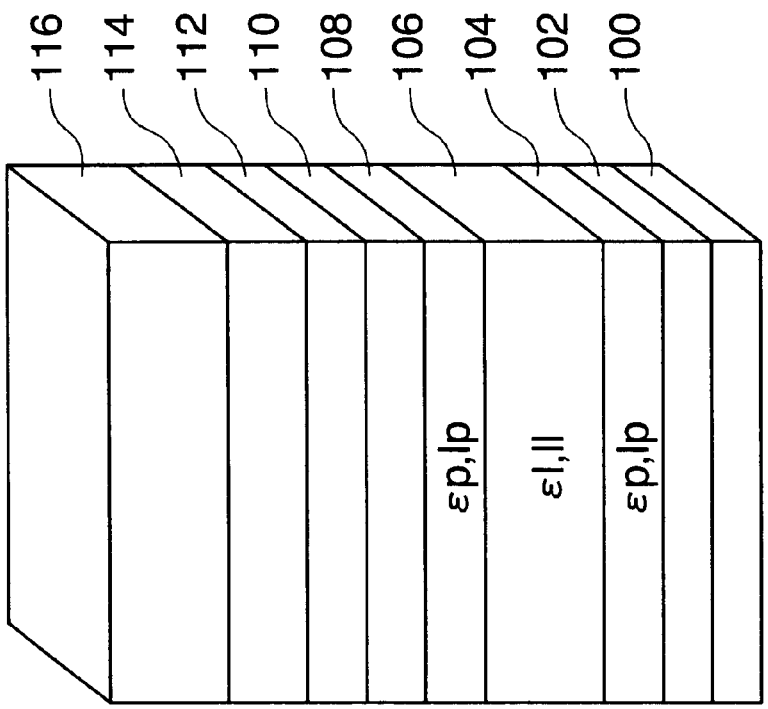
FIG. 2B, a color filter of the present invention.

FIG. 2A is a schematic view showing the section structure of a liquid crystal display apparatus provided with a conventional color filter. The reference numeral 100 in FIG. 2A designates a glass substrate; 102, a conductive film (ITO); 104, a polyimide orientation film; 106, a liquid crystal; 108, a polyimide orientation film; 110, a conductive film (ITO); 112, a protective film; 114, a color filter layer; and 116, a glass substrate. FIG. 2B is a schematic view showing the section of a liquid crystal display apparatus provided with a color filter of the present invention. The reference numeral 200 in FIG. 2B designates a glass substrate; 202, a conductive film (ITO); 204, a thin semiconductor film ($TiO_2$); 206, a color filter layer; 208, a polyimide orientation film; 210, a liquid crystal; 212, a polyimide orientation film; 214, a conductive film (ITO); and 216, a glass substrate. In the liquid crystal display apparatus of the present invention, the polyimide orientation film is formed directly on the color filter layer.

Since the color filter layer produced by the fabrication method of the present invention has a high dielectric constant, it can restrain a drop in effective voltage. Also, as shown in FIG. 2B, the color filter layer of the present invention needs not to be provided with a protective film on top thereof, because it has solvent resistance.

Herein, the relative dielectric constants ($\epsilon$x), film thickness (1x), and area S of one pixel display part of the respective components are set as follows.

Liquid crystal: $\epsilon l=6$, $ll=7$ μm
Orientation film (polyimide): $\epsilon p=4$, $lp=75$ nm×2
$TiO_2$: $\epsilon t=128$, $lt=0.2$ μm
Color filter: $\epsilon c$, $lc$
Polyimide/liquid crystal/polyimide layer: $\epsilon lp$, $llp=lp+ll$
Color filter/$TiO_2$: $\epsilon ct$, $lct=lc+lt$ Area S of display part: 80 μm×240 μm Synthetic capacity Clp of the polyimide/liquid crystal/polyimide layer is afforded by $$C_{lp}=\epsilon_{lp}\epsilon_0 \times S/l_{lp} \quad (1)$$

$$\epsilon_{lp}=\epsilon_l \epsilon_p(l_{lp})/(l \epsilon_p+l_p \epsilon_l) \quad (2)$$

Synthetic capacity Cct of the color filter/TiO2 layer is afforded by $$C_{ct}=\epsilon_{ct}\epsilon_0 \times S/l_{ct} \quad (3)$$

$$\epsilon_{ct}=\epsilon_c\epsilon_t(l_{ct})/(l_c\epsilon_t + l_t\epsilon_c) \quad (4)$$

If a voltage applied to the whole display part (between the upper and lower ITO electrodes) is defined as V, and voltages Vlp and Vc are applied to the polyimide/liquid crystal/polyimide layer and the color filter/TiO2 layer, the ratio Vlp/V of the voltage Vlp applied to the polyimide/liquid crystal/polyimide layer to the voltage V applied to the whole display part is represented as follows.

$$Vlp/V=Cct/(Clp+Cct) \quad (5).$$

From the expressions (1) to (5), the ratio Vlp/V of the voltage Vlp applied to the polyimide/liquid crystal/polyimide layer to the voltage V applied to the whole display part was determined in the case where the relative dielectric constant $\epsilon c$ and film thickness Ic of the color filter were changed.

FIG. 1 shows the result of the calculation in the condition of film thickness lc=0.5 μm, 1 μm, 1.5 μm, 2 μm, and $\epsilon c=2$ to 20. It is expected from FIG. 1 that, if the relative dielectric constant of the color filter is high and the film thickness is thin, a drop in effective voltage can be reduced below 10%. For example, in the case where the color filter is formed with a film thickness of 1.5 μm, if the relative dielectric constant is controlled to 12 or more, a drop in effective voltage is restrained below 10%.

Therefore, if the film thickness of the color filter layer (colored film) of the present invention is 1.5 μm or less, desirably 1.0 μm or less, and the relative dielectric constant of the color filter layer is 5.0 or more, desirably 8.0 or more, a drop in effective voltage can be restrained to 15% or less.

Next, a description will be made of an optical electrodeposition method employed in the color filter fabrication method of the present invention.

Previously, in a method of forming a colored layer by using an aqueous electrodeposition liquid that contains a colorant and a polymeric material decreasing in solubility and dispersibility for an aqueous liquid, depending on a change in pH, the inventor and others completed, as a voltage application unit, by a so-called optical electrodeposition method that employs a method employing photoelectromotive force by light irradiation to a semiconductor layer, a color filter fabricating method (Japanese Published Unexamined Patent Application No. Hei 10-119414, Japanese Published Unexamined Patent Application No. Hei 10-193769 official bulletin, Japanese Published Unexamined Patent Application No. Hei 11-189899, Japanese Published Unexamined Patent Application No. Hei 11-105418, Japanese Published Unexamined Patent Application No. Hei 11-133224, and Japanese Published Unexamined Patent Application No. Hei 11-174790). For the optical electrodeposition method used in the present invention, all electrodeposition techniques disclosed in these official bulletins can be used. A basic configuration of the optical electrodeposition method used in the present invention is as follows. A color filter formation substrate on which a transparent conductive film and a transparent thin semiconductor film are disposed on a transparent substrate in that order is placed so that at least the thin semiconductor film of the above-mentioned color filter forming substrate contacts an aqueous electrodeposition liquid that contains a polymeric material decreasing in solubility and dispersibility for an aqueous liquid, depending on a change in pH. In this state, light is applied to a selected region of the thin semiconductor film, photoelectromotive force is generated in the selected region, a voltage necessary for the electrodeposition is applied between the selected region and an opposing electrode, pH of in the vicinity of the thin semiconductor film is changed, and the polymeric material is deposited on the thin semiconductor film from the electrodeposition liquid. If a voltage based on the photoelectromotive force is much larger than a voltage needed for the electrodeposition, no bias voltage need not be applied. However, if is insufficient, a bias voltage is applied to the conductive film furthermore, in addition to the photoelectromotive force.

In the case where a liquid crystal display substrate on which a thin-film transistor (TFT) and a conductive film array are formed is used as the color filter forming substrate, the liquid crystal display substrate is placed so that at least the thin semiconductor film of the liquid crystal display substrate contacts the electrodeposition liquid. In this state, by irradiating the thin semiconductor film of a selected region with light, photoelectromotive force is generated in the irradiated part and thereby a voltage is applied between the selected region of the thin semiconductor film and the opposing electrode, to deposit a colored film.

Next, a description will be made of an electrodeposition liquid used in the optical electrodeposition method of the present invention.

In the method of fabricating the color filter of the present invention, an electrodeposition material used for an electrodeposition liquid for electrodeposition film formation is an electrodeposition high polymer that has an ionic group, e.g., a carboxyl group, changes in solubility with changes of hydrogen ion density, and deposits. Also, the high polymer must have a cross-linkable group in a molecule. The electrodeposition high polymer has a function to disperse a colorant and a transparent high-dielectric material in the electrodeposition liquid. Also, the electrodeposition high polymer is improved in characteristics such as solvent resistance, heat resistance after it becomes a matrix of a colored film, holds mechanical strength, and is cross-linked by a cross-linkable group in a molecule.

Among transparent high-dielectric materials used in the present invention, there are many substances including titanic acid barium family ferroelectric substances such as $BaTiO_3$, $SrTiO_3$, $CaSnO_3$, $BaSnO_3$, and $BaZrO_3$, and oxides such as zirconic acid lead titanate family, $TiO_2$, and $MgTiO_3$. However, the titanic acid barium family ferroelectric substances cannot be used alone because they have a very large dielectric constant but also have a large temperature coefficient. On the other hand, materials such as $TiO_2$ and $MgTiO_3$, as seen from the fact that they are used for a capacitor for temperature compensation, have extremely small temperature dependency and are therefore desired in terms of ease of use. Oxide semiconductor materials, especially titanium oxides, are desirably used in high-dielectric materials used in the present invention.

Also, the composition that is made up of the polymeric material, high-dielectric material, pigment, and the like in the electrodeposition liquid is almost the same as that of the color filter layer produced. Therefore, a dielectric constant of the color filter layer can be freely controlled by adjusting the quantity of the transparent, high-dielectric materials.

The particle diameter of the high-dielectric materials is important. If the particle diameter of the high-dielectric materials is larger, they are more difficult to disperse stably in the electrodeposition liquid, and also the transparency of the colored film produced would be lost. Therefore, it is desirable that the particle diameter of the high-dielectric materials is 100 nm (0.1 μm), preferably 50 nm or less, especially 20 nm or less.

As a method of dispersing transparent, high-dielectric fine particles in the electrodeposition liquid, an ordinary dispersion method is unlimitedly used. To obtain a high-dielectric colored film, it is desirable to include as large an amount of a high-dielectric material as possible in the electrodeposition liquid. To achieve this, one part of a mixture of the high-dielectric material and colorant and 5.0 or less (volume ratio) part of the polymeric material are desirable to increase the percentage of the transparent high-dielectric material. Also, it is desirable that the ratio of the high-dielectric material and the colorant is between 1:2 and 1:10 inclusive by volume in terms of transparency and relative dielectric constant.

Transparent, high-dielectric materials are much heavier in specific gravity than coloring materials and electrodeposition high polymers. Therefore, there are generally difficulties in dispersing them in the aqueous while maintaining transparency. However, as seen from the fact that titanium oxide is hydrophilic and is used as a white pigment, it is relatively easily dispersed in water, so that a sufficiently transparent aqueous dispersion liquid is obtained.

It was found that combined use of titanium oxide and colorant pigment improved the dispersibility of the titanium oxide. It is desirable that the ratio (volume ratio) of the titanium oxide and pigment is between 1:2 to 1:10 inclusive for balanced achievement of dispersibility and transparency.

Next, a description will be made of a polymeric material that has cross-linkable groups in molecules and decreases in solubility and dispersibility for an aqueous liquid, depending on a change in pH. The polymeric material must have sufficient solubility or dispersibility for aqueous liquid (including pH-adjusted aqueous liquid) and also transparency.

The cross-linkable groups include epoxide groups, block isocyanate groups (including groups changeable to isocyanate groups), cyclocarbonate groups, melamine groups, and the like.

Also, to provide a function to decrease solubility and dispersibility for an aqueous liquid, depending on a change in pH, it is desirable that hydrophilic groups and hydrophobic groups are included in molecules, and probably ionized groups (hereinafter simply referred to as ionized groups) such as carboxyl groups (anionic groups), amino groups (cationic groups), and the like are introduced as the hydrophilic groups. For instance, for polymeric materials having carboxyl groups, the carboxyl groups are dissociated and dissolve in an aqueous liquid in a region where pH is alkaline; and in a region where pH is acid, they are dissociated, and decrease in solubility and deposit.

It is desirable that the above-mentioned polymeric materials have hydrophobic groups in addition to ionized groups. The existence of the hydrophobic groups gives the polymeric materials the function that the groups ion-dissociated by a change in pH as mentioned above are deionized and deposit films at the same. Also, since the hydrophobic groups have a strong affinity to organic pigments used as coloring materials in a method of forming the color filter of the present invention described later, they have the ability to adsorb the organic pigments and provide a pigment dispersion function favorable to polymers.

As hydrophilic groups, hydroxy groups can be included in addition to the ionized groups.

It is desirable that the number of hydrophobic groups in a polymer having hydrophobic groups and hydrophilic groups is in a range of 30% to 80% of the total number of the hydrophilic groups and hydrophobic groups. If the number of hydrophobic groups is less than 30% of the total of hydrophilic groups and hydrophobic groups, a formed film is easy to redissolve and the water-resisting characteristic and film strength of the film may be insufficient. If the number of hydrophilic groups is larger than 80% of the total of hydrophilic groups and hydrophobic groups, because the solubility of the polymer to the aqueous liquid is insufficient, the electrodeposition liquid may become cloudy, deposits of an electrolysis material may occur, and the viscosity of the electrodeposition liquid may increase. Therefore, it is desirable that the number of hydrophobic groups in a polymer having hydrophobic groups and hydrophilic groups is in the above-mentioned range. The percentage of the number of hydrophobic groups to the total number of hydrophilic groups and hydrophobic groups is preferably in a range of 55 to 70%. For polymers in this range, especially film electrodeposition efficiency is high, films can be produced at a low electrodeposition potential, and the liquid characteristics of electrodeposition liquid are also stable.

The above-mentioned polymeric materials include, for example, polymeric monomers having cross-linkable groups, polymeric monomers having hydrophilic groups, and copolymerized monomers having hydrophobic groups.

The above-mentioned polymeric monomer having cross-linkable groups include, for example, glycidyl (meta) acrylate, (meta)acrylic acid azide, methacrylic acid 2(O-[1'-methyl propylidene amino]carboxyl amino) ethyl (SHOWA DENKO K.K., product name: Karenz MO1-BN), 4-((meta) acryloyl hydroxymethyl) ethylene carbonate, (meta)acryloyl melamine, and others. These cross-linkable monomers are generally included by 1 to 20 moles in electrodeposited high molecular compounds, depending on the kind of monomers used.

As the polymeric monomers containing hydrophilic groups, methacrylic acid, acrylic acid, hydroxyethyl methacrylate, acrylamide, maleic anhydride, boletic acid, propiolic acid, itaconic acid, and their derivatives are used, but the present invention is not limited to these. Of these, especially, the methacrylic acid and acrylic acid have high electrodeposition efficiency by a change in pH, and are useful hydrophilic monomers.

Also, as the polymeric monomer materials containing hydrophobic groups, alkene, styrene, a-methylstyrene, a-ethylstyrene, methyl methacrylate, methacrylic acid butyl, acrylonitrile, acetic acid vinyl, acrylic acid ethyl, acrylic acid butyl, methacrylic acid lauryl, and their derivatives are used, but the present invention is not limited to these. Especially, for styrene and α-methylstyrene, because they have a strong hydrophobic characteristic, hysteresis characteristic to redissolution is easily obtained and they are useful hydrophobic monomers.

As cross-linkable polymeric materials used in the color filter fabrication method of the present invention, acrylic acid or methacrylic acid as monomers containing hydrophilic groups, styrene or a-methylstyrene as monomers containing hydrophobic groups, and ternary copolymers employing cross-linkable monomers as mentioned above are desirably used.

The polymeric materials used in the fabrication method of the present invention are polymeric materials produced by copolymerizing, at the above-mentioned ratio, the above-mentioned polymeric monomers respectively containing cross-linkable groups, hydrophilic groups and hydrophobic groups, and the respective kinds of the hydrophilic groups and hydrophobic groups are not limited to one kind. A polymerization degree of 6,000 to 25,000 produces polymeric materials from which excellent electrodeposition films are obtained. Materials produced at a polymerization degree of 9,000 to 20,000 are more desirable. For polymerization degrees lower than 6,000, materials produced are prone to be redissolved. For polymerization degrees higher than 25,000, the solubility to an aqueous liquid becomes insufficient, so that the liquid becomes cloudy, deposits occur, and other problems occur.

Where the above-mentioned polymeric materials have anionic groups of carboxyl groups and the like, when the acid value of the polymeric materials is in a range of 60 to 300, an excellent electrodeposition characteristic is obtained. Especially, a range of 90 to 195 is more desirable. When the above-mentioned acid value is smaller than 60, the solubility to an aqueous liquid becomes insufficient, the solid matter density of electrodeposition liquid cannot be increased to a proper value, the liquid becomes cloudy, deposits occur, liquid viscosity increases, and other problems occur. Also, if the acid value exceeds 300, a formed film is easy to redissolve. Therefore, the above-mentioned range is appropriate.

It is desirable that an electrodeposition liquid in which the above-mentioned polymeric materials are dissolved, according to changes of pH values of the electrodeposition liquid, undergoes the liquid characteristic change of from solution state or dispersion state, to a supernatation state, and then deposition occurrence, within a pH range of 2 or less. If the pH range is 2 or less, an image can be deposited immediately for a sudden pH change by conduction, the coagulation force of the deposited image is high, a redissolution speed to an electrodeposition liquid decreases, and other excellent effects are obtained. These effects bring about a filter layer having high translucency and water-resisting characteristic.

Where the above-mentioned pH range is greater than 2, a decrease in a printing speed for obtaining a satisfactory image structure, the lack of the water-resisting characteristic of images, and others are prone to occur. To obtain more desirable characteristics, the above-mentioned pH range is 1 or less.

Furthermore, it is desirable that the electrodeposition liquid in which the electrodeposition polymeric materials are dissolved not only undergoes a sudden state change leading to the deposit occurrence in accordance with pH value changes but also has a redissolution-resistant characteristic. This characteristic is a so-called hysteresis characteristic. The hysteresis characteristic means that, for example, anionic electrodeposition materials deposit suddenly upon a fall in pH, but redissolution does not occur suddenly upon a rise in pH (e.g., at the end of electrodeposition, that is, in the case where a voltage of 0 is applied), and a deposition state lasts for a given period of time. On the other hand, materials not exhibiting the hysteresis characteristic, for a small rise in pH, increase in solubility and are prone to suffer redissolution of a deposition film.

The polymeric materials having the above-mentioned characteristic are obtained by properly adjusting the kinds of hydrophilic groups and hydrophobic groups, the balance of hydrophilic groups and hydrophobic groups, acid value, molecular weight, and the like.

Dyes and pigments are used as colorants added to the electrodeposition liquid of the present invention. The dyes and pigments need not necessarily have the nature that solubility or dispersibility decreases corresponding to changes of pH of the electrodeposition liquid. In this case, when components, e.g., polymeric materials, other than colorants having the above-mentioned nature coagulate and deposit to produce a film, they are contained in the film and color the film. As dyes decreasing in solubility or dispersibility according to changes of liquid pH, ionic dyes are included. Also, ionic dyes and pigments can be used in combination.

The ionic dyes include dyes of triphenylmethane phthalide family, phenarsazine family, phenothiazine family, fluorescein family, indolylphthalide family, spiropyran family, azaphthalide family, diphenyl methane family, chromenol pyrazole family, leuco auramine family, azomethine family, rhodamine lactal family, naphto lactam family, triazene family, triazole azo family, thiazole azo family, azo family, oxazine family, thiazine family, benzthiazole azo family, quinoneimine family; and hydrophilic dyes having carboxyl group, amino group, and imino group. For example, rose bengal and eosin, which are pigments of a fluorescein family, dissolve in water for pH values of 4 or greater, but go into a neutral state and precipitates for greater pH values. Similarly, Pro Jet Fast Yellow2 of a diazo family dissolves in water for pH values of 6 or greater, but precipitates for smaller pH values.

As pigments, known red, green, and blue pigments can be unlimitedly used, but the smaller the particle diameter of the pigments, the better the reproducibility of hue. In the case of producing a color filter, from the viewpoint of the transparency and dispersibility of a color filter layer, it is desirable that the average particle diameter of the pigments is 200 nm (0.2 $\mu$m), preferably 100 nm (0.1 $\mu$m) or less.

Also, as colorants for the color filter, the colorants described in Japanese Published Unexamined Patent Application Nos. Hei 9-268642 and Hei 9-329798 as materials suitable for a light electrodeposition method can be used.

By using two kinds or more of colorants, a desired mixed color is obtained, and dyes and pigments can be combined. In terms of the ion nature of colorants in the case of producing mixed colors by mixing two kinds of colorants, to prevent the colorants from precipitating or depositing, generally, colorants without polarity or colorants with the same polarity are used. However, because, in a combination of a certain kind of dyes, a complex is not formed and ions coexist, in this case, even if basic solution and acid solution are mixed, deposits can be restrained and the colorants can be used regardless of polarity of ions.

In the present invention, an electrodeposition liquid in which pigments are dispersed by using polymeric materials having anionic groups is desirably used for the color filter.

As film-producing materials included in the electrodeposition liquid of the present invention, the above-mentioned materials can be combined optionally as long as they do not damage the effect of forming thin films; a mixture of molecules with the same polarity such as a mixture of anionic molecules of two or more kinds, or a mixture of molecules with different polarities such as a mixture of an anionic molecule and a cationic molecule can be used.

Next, a description will be made of the conductivity of the electrodeposition liquid. The conductivity relates to electrodeposition speed, that is, electrodeposition quantity. If the conductivity is higher, the film thickness of an electrodeposition film that deposits in a given time becomes thicker, and is saturated at about 20 mS/cm. Accordingly, in the case where conductivity is not sufficient with only the polymeric materials and electrodeposition pigment ions, electrodeposition speed can be controlled by adding ions that exert no influence on electrodeposition, for example, $NH_4^+$ ion and $Cl^-$ ion. Usually, the electrodeposition liquid raises conductivity by adding support salt. Support salts generally used in the electrochemistry include alkali metal salts such as NaCl and KCl, and tetraethyl ammonium salts such as ammonium chloride, nitric acid ammonium, and tetraalkyl ammonium perchlorate ($Et_4NClO_4$).

However, since alkali metals exert a bad influence on the characteristics of thin-film transistors, in the case where a colored film is formed on a substrate on which thin-film transistors are disposed, an electrodeposition liquid containing the alkali metals cannot be used. Accordingly, in the method of the present invention, it is desirable to use ammonium salts such as $NH_4Cl$ and $NH_4NO_3$, and tetraalkyl ammonium salts such as $Et_4NClO_4$, $n\text{-}Bu_4NClO_4$, $Et_4NBF_4$, $Et_4NBr$, and $n\text{-}Bu_4NBr$. Such compounds exert no bad influence on transistor characteristics, even if they exist in electrodeposition films.

pH of the electrodeposition liquid also influences the formation of thin films. For example, if a thin film is produced under the condition that the solubility of film-producing molecules is saturated before film formation, the produced film is difficult to redissolve after the film formation. However, if a film is produced with pH of an unsaturated solution, the produced thin film begins to redissolve upon termination of light irradiation. Accordingly, since it is desirable to form a thin film with pH of a solution whose solubility is saturated, the electrodeposition liquid must be adjusted using acid and alkali with a desired pH.

In the case where a thin film is formed on a substrate on which thin-film transistors (TFT) are disposed, alkali metal salts cannot be used for the same reason mentioned above. Accordingly, in this case, organic alkali materials of amine family and ammonia family are used. Tetramethyl hydro oxide is often used as an etching liquid of photoresist and is suitably used because of the affinity with thin-film transistors.

Next, a description will be made of a color filter forming substrate used in the optical electrodeposition method of the present invention.

Transparent substrates used in the present invention refer to those that transmit light of a visible light area. These include, e.g., plates, sheets or films such as glass plate, polyethylene terephthalate, polyethylene naphthalate, polyethersulfone, polyetherimide, polyether ketone, polyphenylene sulfide, polyalylate, polyimide, and polycarbonate.

Also, transparent conductive thin film disposed on the transparent substrates include, e.g., ITO film, tin dioxide and oxidation indium among others.

Furthermore, as transparent thin semiconductor films, transparent thin film semiconductors that produces electromotive force by light irradiation can all be used. Specifically, the above-mentioned semiconductors include GaN, diamonds, c-BN, SiC, ZnSe, $TiO_2$, ZnO, and others. Of them, titanium oxide desirably used.

Next, combinations of semiconductor and materials capable of forming electrodeposition films depend on the polarity of the semiconductor used. To produce photoelectromotive force, as known as a solar battery, Schottky barrier that occurs in an interface contacting a semiconductor, and pn or pin junction are used. As an example, a description is made of an n-type semiconductor. When there is Schottky barrier between an n-type semiconductor and a solution, if the semiconductor side is made negative, a forward direction in which a current flows is established. Conversely, if the semiconductor side is made positive, no current flows. However, even when the semiconductor side is positive in which case no current flows, if light is applied, electron hole pairs occur and the holes migrate to the solution, so that a current flows. In this case, because the semiconductor electrode is made positive, materials electrodeposited must be negative ions. Accordingly, the combination of the n-type semiconductor and anionic molecules is established, and in contrast, in a p-type semiconductor, cation is electrodeposited.

Especially, titanium oxide has the small absorption of 400 nm or less, and is transparent and can be used as a thin semiconductor film for producing a color filter. Methods of forming a titanium oxide thin semiconductor film on a substrate include a sol-gel method, sputtering method, electron beam evaporation method, ion plating method, and others. n-type semiconductors having excellent characteristics can be obtained by these methods.

However, for substrates having poor heat resistance, for example, plastics films used in the case of producing a flexible color filter, and liquid crystal display substrates on which TFTs described later are disposed, film producing methods that exert no bad influence on the plastics films and TFTs must be selected. Although the sol-gel method can form titanium oxide having high optical activity as optical semiconductor, since about 500 degrees are required for sintering, it is difficult to produce a titanium oxide film in the case of using a plastics film substrate having heat resistance as low as about 200° C., and on a TFT substrate that cannot be heated to 250° C. or higher.

Therefore, in the case of using a plastics film substrate, the sputtering method is desirably used because it enables film production at low temperatures, preferably at 200 degrees or less, and causes little damage to the substrate. (Since the electron beam method and the ion plating method heat the substrate at about 200° C., it is unfavorable.) In the case of using a TFT substrate, a titanium oxide thin film is formed at a low temperature using the sputtering and electron beam heating methods, or by using an application liquid for thin film formation (Toto Ltd., Nippon Soda Co., Ltd., etc.) dispersed with photocatalyst titanium oxide particles (a lift-off method using photoresist).

To form an anatase-type titanium oxide thin film having high optical activity, it is desirable to use the RF sputtering method, which produces a high photoelectromotive force.

A photocatalyst thin film in a range from 0.05 to 3 $\mu$m in thickness provides satisfactory characteristics. For 0.05 $\mu$m or less, light absorption becomes insufficient, and when 3 $\mu$m is exceeded, a crack in the film may occur, deteriorating the film producing capability. Therefore, the above-mentioned range is appropriate.

In the case where an electrodeposition film cannot be formed by photoelectromotive force alone, as mentioned above, an insufficient voltage must be compensated by applying a bias voltage. The upper limit of bias voltages that can be applied is the limit that a Schottky barrier is maintained. When a Schottky barrier breaks, a current flows also in regions to which no light is applied and an electrodeposition film is formed on the entire region of the semiconductor substrate, disabling image formation. For example, in the case where the photoelectromotive force of semiconductor is 0.6 V, for materials electrodeposited with 2.0 V, if light is applied by applying a bias voltage of 1.5 V, a total voltage becomes 2.1 V and a threshold value voltage needed for electrodeposition is exceeded, so that a light electrodeposition film is formed in only the region to which the light was applied.

Figure 3:
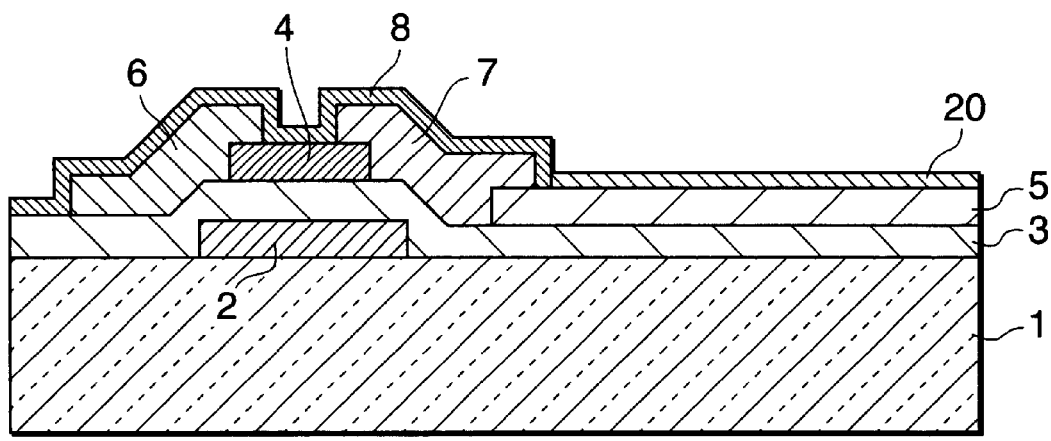
FIG. 3 is a schematic sectional view showing an example of a TFT substrate on which colored films are formed by the optical electrodeposition method.

As a liquid crystal display substrate on which thin-film transistors and a transparent conductive film are arrayed on a transparent substrate and a thin semiconductor film is provided on the conductive film, for instance, the one that is shown in the drawing is used. FIG. 3 shows the section of a liquid crystal display substrate having the structure that a thin semiconductor film is formed on a conductive film, after arraying reverse-staggered-channel-embedding TFTs widely used on a TFT liquid crystal display and the conductive film on the substrate. In the drawing, the reference numeral 20 designates a transparent substrate; 2, a gate electrode; 3, a gate oxidation film; 4, a semiconductor layer; 5, a conductive film (pixel electrode); 6, a source electrode; 7, a drain electrode; 8, a protective film; and 20, a thin semiconductor film.

From the viewpoint of protecting a TFT circuit from an electrodeposition liquid at the time of electrodeposition film formation, it is desirable to cover the TFT of the liquid crystal display substrate with the insulative protective film and cut off the electrodeposition liquid and TFT. An example of a method of forming a protective film includes the steps of applying positive photoresist to a liquid crystal display substrate, inputting light from the side on which a transparent electrode is not formed, performing etching to expose parts other than TFT, that is, a transparent conductive film, and leaving the photoresist in a TFT part. At this time, if a positive black photoresist material is used, the part becomes a black matrix.

As a similar protection method, an insulative protective layer, such as a silicon nitride film (SiNx) can be provided on TFT. This insulative protective film is known as an etching stopper during TFT fabrication. It can be formed by performing etching after forming a film by the CVD (chemical vapor deposition) method.

It is desirable to form a black matrix on the color filter. The optical density of the black matrix must usually be 2.5 or more, and it is necessary that it does not leak light. In the present invention, the black matrix must be insulative and have a low dielectric constant.

Also, in the case where the color filter is fabricated by the optical electrodeposition method, the black matrix can be formed after or before a colored film of plural colors is formed.

Since the color filter of the present invention has a colored film having a high dielectric constant, it is desirable that the black matrix has a low dielectric constant and is insulative.

An example of a method of forming a black matrix after forming a colored film of plural colors includes the steps of applying a black ultraviolet-curing resin or negative photoresist to the entire surface of a color filter forming substrate on which a colored film is formed, next, applying ultraviolet rays, etc. from the back of the above-mentioned substrate, and hardening unformed parts of the colored film, or forming a black resin film (black matrix) left by etching. In addition, the black matrix can also be formed by the electrodeposition method or optical electrodeposition method. This method takes advantage of the fact that, since a colored film of the color filter of the present invention is insulative, it is difficult to form another colored film on this colored film by the electrodeposition method or optical electrodeposition method. Using an electrodeposition liquid for black matrix formation, a black matrix is formed on a color filter forming substrate on which a colored film is formed, by the electrodeposition method or optical electrodeposition method.

Methods of forming a black matrix before forming a colored film include the optical electrodeposition method that uses an electrodeposition liquid for black matrix formation, and forms a black matrix only in light irradiated parts by using a photomask, and the photolithography method.

In the case of using a color filter forming substrate on which TFTs are disposed, a method of forming a black matrix includes the steps of applying a black ultraviolet-curing resin or negative photoresist to the face on which a colored film is formed, as mentioned above, and then applying ultraviolet rays, etc. from the back of the substrate.

Also, one dominant method includes the steps of applying a black positive photoresist to the entire surface of a TFT color filter forming substrate before forming the color filter, and applying light from the side on which TFTs are not disposed, then performing etching to leave black resist parts in TFT parts in which light is cut off.

The above-mentioned black resist layer also serves as both an insulative protective film and a black matrix.

The black matrix can also use TFT electrodes. Although the light cutoff capability of the gate electrode and source electrode of a TFT circuit is inherently high, if the gate electrode and source electrode are formed by a metal film of low reflection, for example, a Cr film, etc. of two or three layers, since the electrodes and electrode line part also serve as a black matrix after the formation of the color filter, a special black matrix need not be provided.

In this case, the numerical aperture of the color filter can be maximized so that a very bright and high-definition liquid crystal display element can be formed. In the case of using the TFT electrodes and electrode line as a black matrix, the black matrix can be made insulative, when arraying the TFTs and the transparent conductive film, by producing the TFT electrodes using a material of low reflection, providing an insulative protective layer such as a silicon nitride film on the electrodes, and then forming a transparent conductive film, which is a pixel electrode.

If insulation from the color filter layer is kept, a method of forming a metallic black matrix by an ordinary method can also be used.

Other known methods of forming a black matrix can be unlimitedly used.

Next, a description will be made of an photocatalyst film producing method used for the color filter fabricating method of the present invention. The photocatalyst film producing method is a technique disclosed in Japanese Published Unexamined Patent Application No. Hei 11-322507 and Japanese Published Unexamined Patent Application No. Hei 11-322508. A brief description of the technique is given below.

The above-mentioned optical electrodeposition method relies on photoelectromotive force for all or a part of voltage necessary for the electrolysis of water. On the other hand, with the photocatalyst method, by using the light catalysis of optical semiconductor, if light is only applied without supplying electricity from the outside, the electrolysis of water occurs in a solution contacting titanium oxide and hydrogen ion density can be changed. Therefore, according to this method, without causing conduction from the outside as in the above-mentioned optical electrodeposition method, the hydrogen ion density of a solution contacting a semiconductor can be changed, so that the precipitation of substance from a liquid, that is, film production is enabled. In other words, an internal circuit is formed between a thin semiconductor film and a conductive film, and therefore electrolysis occurs even if voltage is not applied from the outside. In the internal circuit, the conductive thin film operates as a counter electrode, and the thin semiconductor film operates as an action electrode.

The above-mentioned phrases "a color filter forming substrate on which a conductive thin film is in conduction with an electrolyte" and "bringing a conductive film into conduction with an electrolyte" mean to directly or indirectly bring the conductive thin film and the electrolyte into conduction so that an internal circuit can be formed among the thin semiconductor film, the conductive thin film, and the electrolyte, as in the method of disposing the thin semiconductor film of the color filter forming substrate so that a part of the conductive thin film is exposed, and bringing the conductive thin film into contact with the electrolyte, thereby bringing the conductive thin film and the electrolyte into conduction, and the method of connecting electrodes to the conductive thin film of the color filter forming substrate through lead wires, etc., bringing the electrodes into contact with the electrolyte, thereby bringing the conductive thin film and the electrolyte into conduction. Furthermore, the phrase "a conductive thin film contacts an electrolyte" means that at least a part of the conductive thin film contacts the electrolyte. Therefore, this includes the case where only the sides of the film of the conductive thin film contact the electrolyte.

Figure 4:
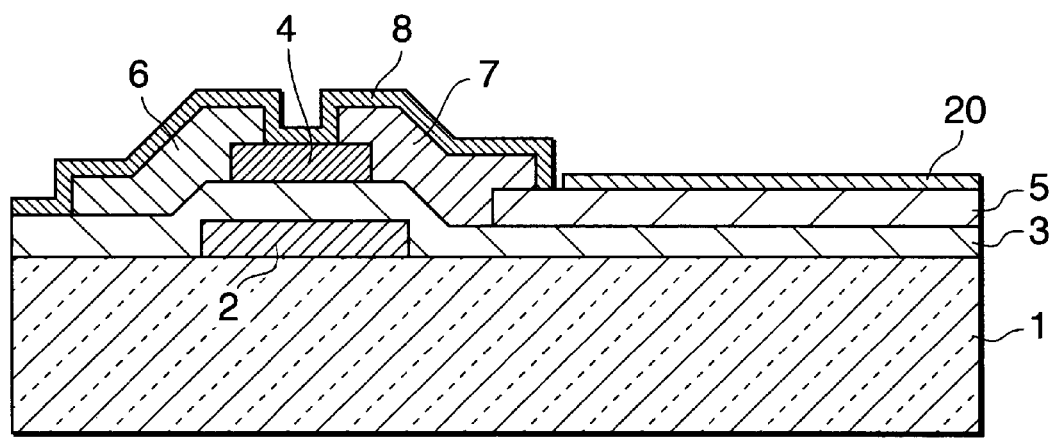
FIG. 4 is a schematic sectional view showing an example of a TFT substrate on which colored films are formed by the photocatalyst method.

As color filter forming substrates in the photocatalyst method, there can be used those that a transparent conductive film is disposed on a transparent substrate such as a glass substrate and a transparent plastics film, and a transparent thin semiconductor film is disposed so that it contacts the conductive film and a part of the conductive film is exposed, or those that a conductive film and a thin semiconductor film are disposed on a transparent substrate in the shape of pixel pattern (a part of the conductive film must be exposed) (see FIG. 4 of Japanese Published Unexamined Patent Application No. Hei 11-322507). For transparent substrates, transparent conductive films, transparent thin semiconductor films, and methods of producing the films, those in the optical electrodeposition method can be similarly used.

An example of a liquid crystal display substrate on which TFTs are disposed is shown in FIG. 4. The substrate shown in the drawing is different from a TFT substrate shown in FIG. 3, only in that a thin semiconductor film is disposed with a part of the conductive film (pixel electrode) exposed so that the conductive film can contact an electrolyte.

Also, to protect the TFTs from the electrolyte during colored film formation, the insulative protective film described in the description of the optical electrodeposition method can be similarly disposed on the TFTs.

As an electrolyte used in the photocatalyst method, an electrodeposition liquid used in the optical electrodeposition method can be used.

Next, a description will be made of a method of forming a black matrix in the case of forming a colored film by using the photocatalyst method. As a method of forming a black matrix after forming a colored film, by irradiating the entire surface of the color filter forming substrate with light, using an electrolyte for black matrix formation, a black matrix is formed in a colored-film-not-formed part of the thin semiconductor film. As another method, a black ultraviolet-curing resin or a black negative photoresist is applied to the whole of the face on which the colored film is formed, ultraviolet rays, etc., are applied from the back of the substrate, and then the resin of unhardened parts or etching-capable parts is removed.

Methods of forming a black matrix before forming a colored film include the photocatalyst method, which uses an electrolyte for black matrix formation and forms a black matrix at a light irradiated part by a photomask, and ordinary photolithography methods.

For a TFT integrated color filter, the black matrix forming method in a TFT integrated color filter by the above-mentioned optical electrodeposition method is similarly applicable.

Next, a color filter fabricating apparatus of the present invention will be described.

Although the present invention places no special limitations on a method of selectively irradiating a thin semiconductor film with light, it is desirable to use a photomask in terms of precision and handling.

Figure 5:
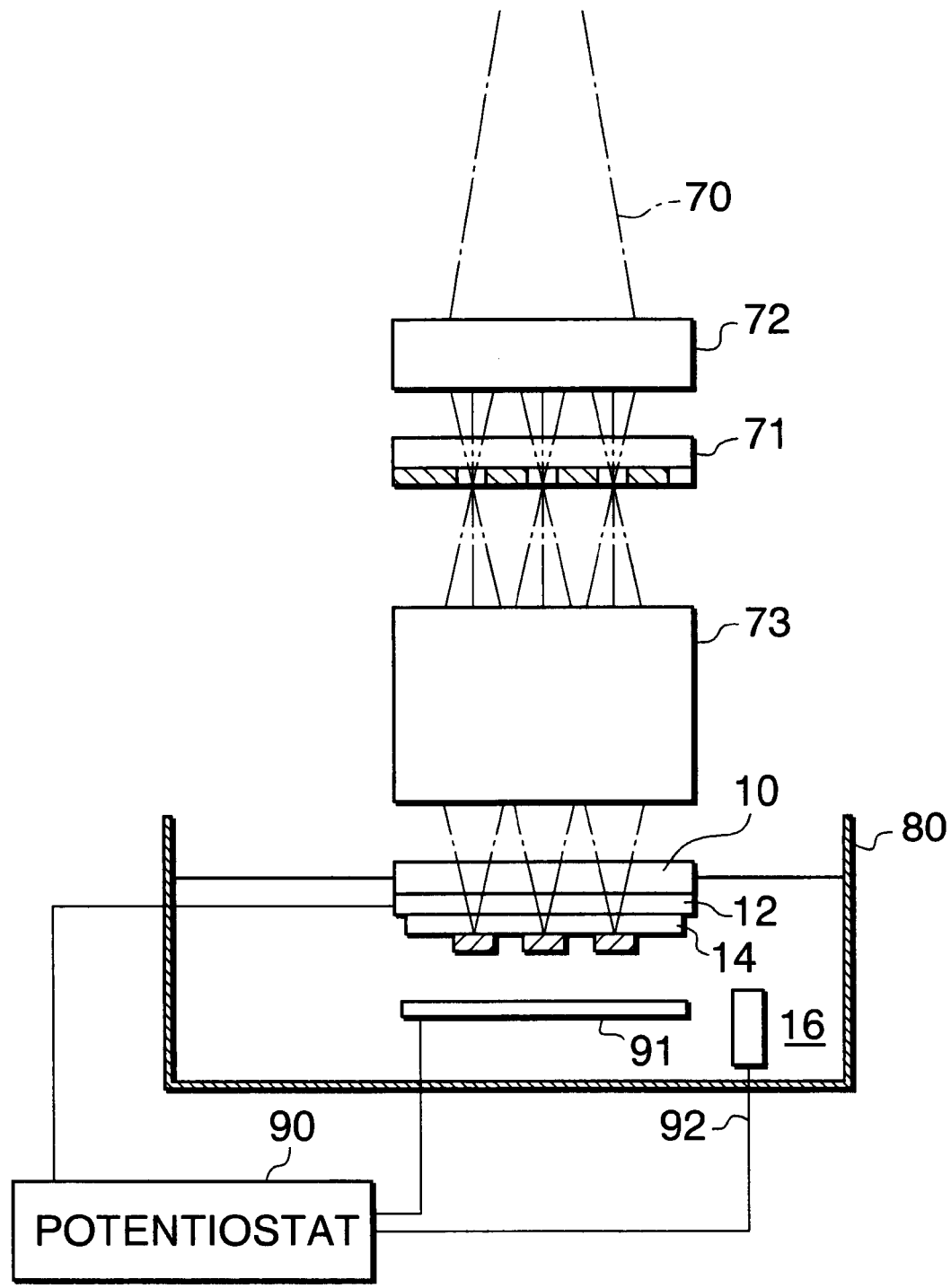
FIG. 5 is a conceptual view showing an example of a color filter fabricating apparatus that forms colored films by the optical electrodeposition method.

FIG. 5. is a conceptual diagram illustrative of a color filter fabricating apparatus that uses a photomask and forms a colored film by the optical electrodeposition method. The color filter fabricating apparatus shown in FIG. 5 includes: a light source (not shown) for applying ultraviolet rays; an imaging optical system having a first imaging optical lens 72 and a second imaging optical lens 73; a photomask 71 inserted between the first imaging optical lens and the second imaging optical lens; an electrodeposition cell 80 storing an electrodeposition liquid; a unit 90 for voltage application such as a potentiostat; an opposing electrode 91; and a reference electrode 92 such as a saturation calomel electrode. Also, in place of the above-mentioned imaging optical system in the abovementioned color filter fabricating apparatus, a mirror reflection optical system can also be used. As shown in FIG. 5, in the above-mentioned apparatus, a color filter forming substrate is placed in the electrodeposition cell for use.

It is desirable to restrain the diffraction of light by making the thickness of the above-mentioned transparent substrate 0.2 mm or less and applying parallel light or applying light with a close contact exposure apparatus. Also, it is desirable from the point of handling that the distance between the imaging optical lens and the transparent substrate face of the above-mentioned imaging optical system is in a range of 1 mm to 50 cm, and it is desirable from the point of precision and handling that the focus depth of the imaging optical system is in a range of ±10 to ±100 μm.

In the case of applying electrodeposition to the color filter forming substrate on which TFTs are disposed, the opposing electrode is connected with a TFT circuit.

Figure 6:
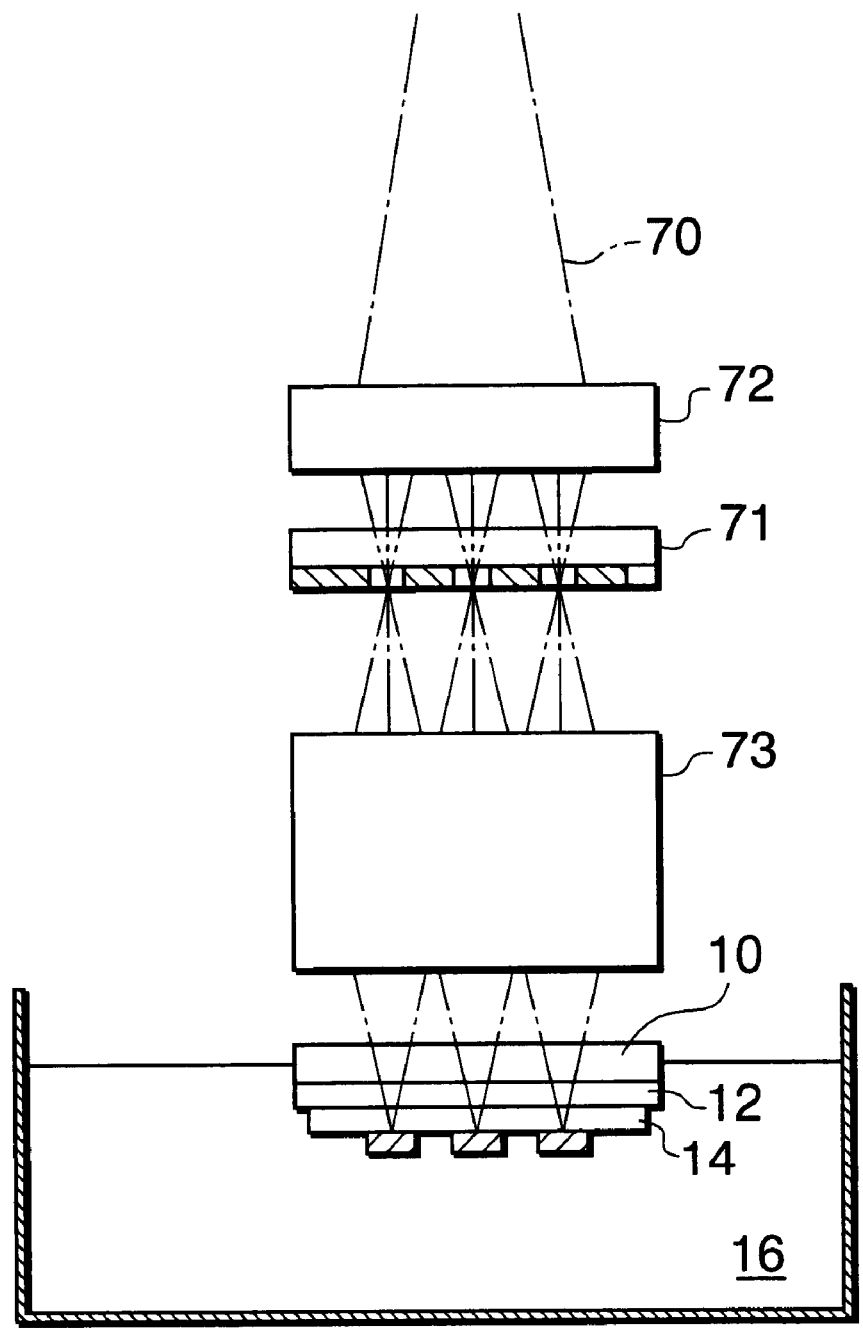
FIG. 6 is a conceptual view showing an example of a color filter fabricating apparatus that forms colored films by the photocatalyst method.

FIG. 6 is a conceptual diagram illustrative of a color filter fabricating apparatus that forms a colored film by the photocatalyst method. The color filter fabricating apparatus shown in FIG. 6 has a configuration that the unit 90 for voltage application, the opposing electrode 91, and the reference electrode 92 are excluded from the color filter fabricating apparatus by the optical electrodeposition method of FIG. 5. This color filter fabricating apparatus can obtain highly excellent color filter films simply and at low cost because it need not use an electrodeposition apparatus and special electrodes for electrodeposition.

Also, in the case of irradiating the entire surface of the color filter forming substrate having TFTs with light, selectively driving TFTs, and forming a colored film on pixels of a conductive film (thin semiconductor film) corresponding to TFTs not selected, a light irradiation apparatus, a TFT driving circuit, and an opposing electrode are required (see FIG. 2 of Japanese Published Unexamined Patent Application No. Hei 11-322508).

The color filter of the present invention, which is produced by the above-mentioned fabricating method, includes: a color filter forming substrate on which at least a transparent conductive film and a transparent thin semiconductor film are disposed in this order on a transparent substrate; and an insulative black matrix having a low dielectric constant that has a solvent-resistant colored film with a dielectric constant of 4.5 or more provided on the thin semiconductor film, wherein the above-mentioned conductive film functions as a liquid crystal driving electrode. A color filter in which TFTs are disposed on the above-mentioned color filter forming substrate is a TFT integrated color filter.

Since the color filter of the present invention has solvent resistance, without providing a protective film thereon, a liquid crystal orientation film can be provided directly thereon. Therefore, taking advantage of the high dielectric constant of the colored film of the color filter, the conductive film can be used as a liquid crystal driving electrode.

Furthermore, the liquid crystal display apparatus of the present invention includes at least: the above-mentioned color filter; a liquid crystal orientation film provided on top of the colored films of the color filter; an opposing substrate placed in opposed relation with the color filter; and a liquid crystal material encapsulated between the above-mentioned liquid crystal orientation film and the opposing substrate, wherein no protective film is provided between the liquid crystal orientation film and the liquid crystal. FIG. 2B shows the section of an example of the liquid crystal display apparatus of the present invention. In the case of a TFT integrated color filter, the reference numerals 200 and 202 in FIG. 2B designate a TFT substrate.

Since the color filter fabricating method by the optical electrodeposition method and the photocatalyst method can form high-dielectric color filter films (colored films), a voltage drop during liquid crystal driving is restrained. Therefore, a contact hole and a transparent conductive film for liquid crystal driving need not to be formed, and the conductive film (pixel electrode) can be used as a liquid crystal driving electrode.

Also, since the color filter fabricating method of the present invention employs the optical electrodeposition method and the photocatalyst method, without the need to use photolithography and with a small number of processes, it can provide a high-resolution and easy-to-control color filter with sharp edges at pixels. Also, the method can provide for color filter patterns of fine, complicated pixel placement, eases the formation of a black matrix, and contributes to the mass production of simple color filters. Furthermore, since colored films of the color filter of the present invention have solvent resistance, a protective film need not be formed before forming an orientation film, providing the advantage of further reducing the number of processes.

The photocatalyst method, in addition to these effects, has the advantage that it does not require an electrodeposition apparatus (including electrodes, etc.).

Since the color filter of the present invention has solvent resistance, without providing a protective film thereon, a liquid crystal orientation film can be provided directly thereon. Therefore, taking advantage of the high dielectric constant of the colored films of the color filter, the conductive film can be used as a liquid crystal driving electrode.

Also, since the liquid crystal display apparatus of the present invention has a color filter as mentioned above, it is excellent in resolution, etc., and it is unnecessary to form a protective film beforehand when forming a liquid crystal orientation film. Therefore, the liquid crystal display apparatus can be fabricated with a small number of processes and at a low cost.

EMBODIMENT EXAMPLES

Hereinafter, the present invention will be described in more detail with reference to embodiment examples, but the present invention is not limited to these embodiment examples.

Embodiment Example 1

Production of a Color Filter Forming Substrate

A transparent ITO conductive film 75 nm thick was produced on a non-alkali glass substrate (7059 glass) 0.5 mm thick with sputtering, and furthermore a $TiO_2$ film 200 nm thick was produced.

Formation of a Red Colored Film

The above-mentioned liquid crystal display substrate was placed in an electrodeposition liquid of 7% solid density by weight (pH=7.8, conductivity=8 mS/cm) so that the $TiO_2$ film contacted it, wherein the electrodeposition liquid contained Styrene acrylic acid/methacrylic acid 2(O-[1'methyl propylidene amino]carboxyamino) ethyl copolymer (molecular weight 13,000, 65% hydrophobic groups (hydrophilic groups plus hydrophobic groups) by mole, acid value 150, methacrylic acid 2(O-[1'-methyl propylidene amino]carboxyamino) containing 3.3% ethyl by mole. Hereinafter, these cross-linkable polymeric materials are simply referred to as "cross-linkable polymeric materials".), and a mixture of pigment and high-dielectric material (azo family red ultrafine particle pigment and titanium oxide ultrafine particle mixed at a volume ratio of 1 to 0.3. Hereinafter, a mixture of pigment and high-dielectric material is referred to as "pigment mixture".), which were dispersed at a volume ratio of 1 to 1 for cross-linkable polymeric materials and the pigment mixture.

Using an apparatus as shown in FIG. 5, ultraviolet rays were applied from the back of the substrate. For the ultraviolet rays, a projection type exposure apparatus manufactured by Ushio Inc. was used (light strength 50 mW/cm² of wavelength 365 nm, the distance 10 cm between an imaging lens and imaging face, focus depth ±50 μm). The projection style exposure apparatus was adjusted so that an image was temporarily formed on a photomask and then was formed on a titanium oxide surface of the substrate through optical lenses. As a voltage application apparatus, a 3-pole type apparatus generally used in the electrochemistry was used, and a platinum black was used in a counter electrode. With the $TiO_2$ film as an action electrode for a saturation calomel electrode, the $TiO_2$ film was exposed for three seconds in the condition in which a voltage of 1.7 V was applied. A red colored film was formed only in regions of the $TiO_2$ surface to which light was irradiated. This was washed with pure water.

Formation of Green Colored Film

Except that the pigment was changed to a phthalocyanine green ultrafine particle pigment, an electrodeposition liquid was prepared in the same way as for the red colored film, a green colored film was similarly formed, and it was washed with pure water.

Formation of Blue Colored Film

Except that the pigment was changed to a phthalocyanine green ultrafine particle pigment, an electrodeposition liquid was prepared in the same way as for the red colored film, a blue colored film was similarly formed, and it was washed with pure water.

Baking

The color filter forming substrate on which the colored films was formed was heated at 170° C. for 30 minutes.

Formation of Black Matrix

Instead of the pigment mixture at the time of the red colored film formation, an electrodeposition liquid of 7% solid density by weight (pH=7.8, conductivity=8 mS/cm) in which a carbon black powder (average particle diameter 80 nm) was dispersed at a solid weight ratio of 1 to 0.7 for cross-linkable polymeric materials and carbon black was used. Except that no ultraviolet rays were applied and a 2.3-V voltage was applied for 3 seconds, in the same way as for the red colored film formation, a black matrix was formed in the region in which the colored films were not formed.

As a result, a color filter was created which had solvent-resistant colored films having a high dielectric constant (relative dielectric constant 6.0), and included a black matrix including a film containing carbon black. In the case of producing the liquid crystal display apparatus by using the color filter, a protective film is not required.

Embodiment Example 2

Production of Color Filter Forming Substrate

After washing an ITO-containing polycarbonate film 125 μm thick, Anatase type titanium oxide 200 nm thick was formed by the RF sputtering method to fabricate a color filter forming substrate.

Production of Color Filter

Except that an exposure time at the time of forming a colored film and a black matrix was changed to 10 seconds, in the same way as in the embodiment example 1, red, green, and blue colored films were formed. Next, using the electrodeposition liquid for the black matrix formation of the embodiment example 1, a 1.7-V voltage was applied, and the entire surface of the substrate was exposed for 10 seconds by a mercury xenon lamp from the back of the substrate. After washing with water, baking was performed at 170° C. for 30 minutes.

A flexible color filter was created which had solvent-resistant colored films having a high dielectric constant (relative dielectric constant 6.0), and included a black matrix including a film containing carbon black. In the case of producing the liquid crystal display apparatus by using the color filter, a protective film is not required.

Embodiment Example 3

Color Filter Forming Substrate

The same substrate in used in the embodiment example 1 was used.

Formation of Black Matrix

The apparatus shown in FIG. 5 and the same electrodeposition liquid for forming a black matrix as in the embodiment example 1 were used, and light electrodeposition was performed with the same exposure condition and application voltage as for colored film formation in the embodiment example 1, to form a black matrix in a light irradiated part.

Colored Film Formation and Baking

In the same way as in embodiment example 1, red, green, and blue colored films are formed, and baking was similarly performed. As a result, the same color filter as in the embodiment example 1 was produced.

Embodiment Example 4

The same color filter forming substrate as in the embodiment example 1 was used, and in the same way as in the embodiment example 1, red, green, and blue colored films were formed. After this, the substrate was washed with pure water. Next, the substrate face on which the colored films were formed was brought into contact with an ultraviolet-curing resin solution containing a carbon black powder (average particle diameter 80 nm), and UV light was applied from the back of the substrate. As a result, a hardened black resin thin film (black matrix) was formed only in the region in which the colored films were not formed. After cleaning, heating was performed at 170° C. for 30 minutes.

A solvent-resistant color filter having a high dielectric constant was obtained.

Embodiment Example 5

Color Filter Forming Substrate

The same flexible substrate as in the embodiment example 2 was used.

Production of Color Filter

Except that the exposure time (3 seconds) in the embodiment example 1 was changed to 5 second, in the same way as the embodiment example 1, red, green, and blue colored films were formed. Next, the electrodeposition liquid for forming the black matrix in embodiment example 1 was used, and exposure was carried out with an application voltage of 1.7 V, and the same exposure apparatus at the time of the above-mentioned colored film formation. As a result, a black matrix was formed in the region in which the colored films were not formed. After cleaning, baking was performed at 170° C. for 30 minutes.

A solvent-resistant color filter having a high dielectric constant was obtained.

Embodiment Example 6

This example shows that a color filter is produced by the photocatalyst method.

Production of Color Filter Forming Substrate

A transparent conductive film (ITO) 75 nm thick was formed on a non-alkali glass substrate (7059 glass manufactured by Corning, Inc.) 0.5 mm thick, and furthermore, a titanium oxide thin film 200 nm thick was formed on the entire surface of the substrate. Next, $CO_2$ lasers adjusted in output (spot diameter: 10 μm) were scanned to shave only the titanium oxide surface, and an ITO thin film was exposed to the region in which a black matrix is to be formed.

Production of Red Colored Film

As an electrolyte, a liquid having the same composition as the electrodeposition liquid for the red colored film formation in the embodiment example 1 was used. In this liquid, the above-mentioned substrate was placed so that the conductive film and titanium oxide thin film for the above-mentioned color filter forming substrate contacted each other. A Hg—Xe lamp uniform irradiation light source manufactured by Yamashita Denso of 1 KW was as a light source, and through a photomask, DeepUV light was applied for one minute from the back of the substrate.

As a result, a red colored film was formed in a part to which the light was applied. The colored film was washed with pure water.

Formation of Green Colored Film

Except that, as an electrolyte, a liquid having the same composition as the electrodeposition liquid for the green colored film formation in embodiment example 1 was used, in the same way as the red colored film formation, a green colored film was formed. As a result, a green colored film was formed in a part to which the light was applied. The colored film was washed with pure water.

Formation of Blue Colored Film

Except that, as an electrolyte, a liquid having the same composition as the electrodeposition liquid for the blue colored film formation in the embodiment example 1 was used, in the same way as the red colored film formation, a blue colored film was formed. As a result, a blue colored film was formed in a part to which the light was applied. The colored film was washed with pure water.

Formation of Black Matrix

An ultraviolet-curing resin containing carbon black was applied, DeepUV light was applied from the back, and a black thin film (black matrix) was formed in only the region through which the light transmitted and in which no colored layer was formed.

Next, baking was performed at 170° C. for 30 minutes. A high-dielectric color filter was formed on the substrate.

Embodiment Example 7

Production of Liquid Crystal Display Substrate

Thin film transistors (amorphous silicon TFT, internal resistance: 1 MΩ) and pixel electrodes of transparent conductive films (ITO) were formed on a non-alkali glass substrate (1737 glass manufactured by Corning, Inc.) 0.7 mm thick. At this time, gate electrodes and drain electrodes of the TFTs were formed of two-layer chrome so that the electrode and power line portion could also serve as a black matrix after the formation of a color filter layer. After an insulative layer was provided by silicon nitride, when the pixel electrode was formed by the ITO, the ITO was extended so that it overlapped on the power line. Thereby, transparent regions other than the pixel electrode regions were removed, and a substrate produced as a result was used as a TFT substrate.

Formation of a Red Colored Film

The above-mentioned liquid crystal display substrate was placed in an electrodeposition liquid of 7% solid density by weight (pH=7.8, conductivity=8 mS/cm) so that the conductive film contacted it, wherein the electrodeposition liquid contained Styrene acrylic acid/methacrylic acid 2(O-[1'methyl propylidene amino]carboxyamino) ethyl copolymer (molecular weight 13,000, 65% hydrophobic groups (hydrophilic groups plus hydrophobic groups) by mole, acid value 150, methacrylic acid 2(O-[1'-methyl propylidene amino]carboxyamino) containing 3.3% ethyl by mole. Hereinafter, these cross-linkable polymeric materials are simply referred to as "cross-linkable polymeric materials".), and a mixture of pigment and high-dielectric material (azo family red ultrafine particle pigment and titanium oxide ultrafine particle mixed at a volume ratio of 1 to 0.3. Hereinafter, a mixture of pigment and high-dielectric material is referred to as "pigment mixture".), which were dispersed at a volume ratio of 1 to 1 for cross-linkable polymeric materials and the pigment mixture.

As an electrodeposition application apparatus, a 3-pole type apparatus generally used in the electrochemistry was used. A platinum black was used in a counter electrode. An action electrode of the potentiostat was connected to a source electrode, a voltage of 10 V was applied to a saturation calomel electrode, the TFT circuit was driven so that a voltage was applied to the gate electrode of a proper TFT, corresponding to the pixel electrode to form a red colored film, and a voltage was applied to a proper pixel electrode for one minute.

As a result, a red colored film was formed on the pixel electrode. It was washed with pure water.

Formation of Green Colored Film

Except that the pigment was changed to a phthalocyanine green ultrafine particle pigment, in the same way, an electrodeposition liquid was prepared, a green colored film was formed on a proper pixel electrode, and it was washed with pure water.

Formation of Blue Colored Film

Except that the pigment was changed to a phthalocyanine green ultrafine particle pigment, in the same way, an electrodeposition liquid was prepared, a blue colored film was formed on a proper pixel electrode, and it was washed with pure water.

Baking

The color filter forming substrate on which the colored films were formed was heated at 170° C. for 30 minutes. As a result, a TFT integrated color filter was created which had solvent-resistant colored films having a high dielectric constant (relative dielectric constant 6.0), and in which TFT insulative electrodes function as a black matrix. In the case of producing the liquid crystal display apparatus by using the color filter, a protective film is not required.

Embodiment Example 8

Production of Liquid Crystal Display Substrate

Thin film transistors (polysilicon silicon TFT, internal resistance: 100 KΩ) and pixel electrodes of transparent conductive films (ITO) were formed on a non-alkali glass substrate (1737 glass manufactured by Corning, Inc.) 0.7 mm thick. At this time, gate electrodes and drain electrodes of the TFTs were formed of two-layer chrome so that the electrode and power line portion could also serve as a black matrix after the formation of a color filter layer. After an insulative layer was provided by silicon nitride, when the pixel electrode was formed by the ITO, the ITO was extended so that it overlapped on the power line. Thereby, transparent regions other than the pixel electrode regions were removed, and a substrate produced as a result was used as a TFT substrate.

Production of Color Filter

Red, green, and blue colored films were formed in the same way as in the embodiment 1, then baking was performed, and a TFT integrated color filter in which the TFT insulative electrodes functioned as a black matrix and the same colored films as in embodiment example 1 were formed was produced.

Embodiment Example 9

Production of Liquid Crystal Display Substrate

Thin film transistors (polysilicon silicon TFT, internal resistance: 100 KΩ) and pixel electrodes of transparent conductive films (ITO) were formed on a non-alkali glass substrate (1737 glass manufactured by Corning, Inc.) 0.7 mm thick, and a liquid crystal display substrate was produced.

Formation of Black Matrix

A black resist was applied to the liquid crystal display substrate, light was applied from the back of the substrate, and etching was performed only light irradiated regions to expose pixel electrodes. A black matrix was formed in a portion through which light did not transmitted. The black matrix also functions as an insulative protective film for the TFTs.

Production of Color Filter

Red, green, and blue colored films were formed in the same way as in the embodiment 1, then baking was performed, and a TFT integrated color filter which had a black matrix made of black resist and in which the same colored films as in the embodiment example 1 were formed was produced.

Embodiment Example 10

Production of Liquid Crystal Display Substrate

Thin film transistors (amorphous silicon TFT, internal resistance: 1 MΩ) and pixel electrodes of transparent conductive films (ITO) were formed on a non-alkali glass substrate (1737 glass manufactured by Corning, Inc.) 0.7 mm thick.

Formation of Insulative Protective Film

A positive resist was applied to the liquid crystal display substrate, light was applied from the back of the substrate, and etching was performed only light irradiated regions to expose pixel electrodes. The resist in a portion through which light did not transmit functions as an insulative protective film for the TFTs.

Production of Colored Film

Red, green, and blue colored films were formed in the same way as in the embodiment 1, then baking was performed.

Formation of Insulative Protective Film

An ultraviolet-curing resin containing carbon black was applied to a colored film formation face of the baked liquid crystal display substrate, light was applied from the back of the substrate, and a black matrix was formed only in a region from which light leaked.

As a result, a TFT integrated high-dielectric color filter which had a black matrix made of black resin and in which the same colored films as in the embodiment example 1 were formed was produced.

Since the color filter fabricating method by the optical electrodeposition method and the photocatalyst method of the present invention can form high-dielectric color filter films (colored films), a voltage drop during liquid crystal driving is restrained. Therefore, a contact hole and a transparent conductive film for liquid crystal driving need not to be formed, and the conductive film (pixel electrode) can be used as a liquid crystal driving electrode.

Also, since the color filter fabricating method of the present invention employs the optical electrodeposition method and the photocatalyst method, without the need to use photolithography and with a small number of processes, it can provide a high-resolution and easy-to-control color filter with sharp edges at pixels. Also, the method can provide for color filter patterns of fine, complicated pixel placement, eases the formation of a black matrix, and contributes to the mass production of simple color filters. Furthermore, since colored films of the color filter of the present invention have solvent resistance, a protective film need not be formed before forming an orientation film, providing the advantage of further reducing the number of processes.

The photocatalyst method, in addition to these effects, has the advantage that it does not require an electrodeposition apparatus (including electrodes, etc.).

Since the color filter of the present invention has solvent resistance, without providing a protective film thereon, a liquid crystal orientation film can be provided directly thereon. Therefore, taking advantage of the high dielectric constant of the colored films of the color filter, the conductive film can be used as a liquid crystal driving electrode.

Also, since the liquid crystal display apparatus of the present invention has a color filter as mentioned above, it is excellent in resolution, etc., and it is unnecessary to form a protective film beforehand when forming a liquid crystal orientation film. Therefore, the liquid crystal display apparatus can be fabricated with a small number of processes and at low cost.

The entire disclosure of Japanese Patent Applications No. 2000-227721 filed on Jul. 27, 2000 and No. 2000-349605 filed on Nov. 16, 2000, each of which includes specification, claims, drawings and abstract is incorporated herein by reference in its entirety.

What is claimed is:

1. A color filter fabricating method, comprising the steps of:
 placing a color filter forming substrate formed by providing a transparent conductive film and a transparent thin semiconductor film on a transparent substrate in this order so that at least the thin semiconductor film of the color filter forming substrate contacts an aqueous electrodeposition liquid which contains a colorant, a transparent, high-dielectric material having a particle diameter of 100 nm or less, and a polymeric material that has cross-linkable groups in molecules and decreases in solubility and dispersibility for an aqueous liquid, depending on a change in pH;
 in this state, irradiating a selected region of the thin semiconductor film with light to apply a voltage between the thin semiconductor film of the selected region and an opposing electrode; and
 depositing a high-dielectric colored film in the selected region of the thin semiconductor film.

2. The color filter fabricating method according to claim 1, wherein a bias voltage is also applied between the thin semiconductor film and the opposing electrode.

3. The color filter fabricating method according to claim 1, after performing the step of depositing a colored film in the thin semiconductor film of the selected region, repeating once or more the process using an electrodeposition liquid or electrolyte in which the colorant is changed to a colorant having another hue.

4. The color filter fabricating method according to claim 1, wherein the colored film is subjected to a heating process after being deposited.

5. The color filter fabricating method according to claim 1, wherein the relative dielectric constant of the colored film after the heating process is 4.0 or more.

6. The color filter fabricating method according to claim 1, wherein the thickness of the transparent substrate is made 0.2 mm or less, and light diffraction is restrained by applying parallel light or applying light by a close contact exposing apparatus.

7. The color filter fabricating method according to claim 1, wherein the selected region is irradiated with light by using a photomask.

8. The color filter fabricating method according to claim 7, wherein an imaging optical system is inserted between the photomask and the color filter forming substrate to form an image on the thin semiconductor film face.

9. The color filter fabricating method according to claim 8, wherein the distance between an imaging optical lens of the imaging optical system and the transparent substrate face is from 1 mm to 50 cm.

10. The color filter fabricating method according to claim 8, wherein the focus depth of the imaging optical system is in a range of $\pm 10$ to $\pm 100$ $\mu$m.

11. The color filter fabricating method according to claim 7, wherein a mirror reflection optical system is inserted between the photomask and the color filter forming substrate to form an image on the thin semiconductor film face.

12. The color filter fabricating method according to claim 1, after forming colored films of plural colors on the color filter forming substrate, further comprising the steps of:
 applying a black ultraviolet-curing resin or negative photoresist to the entire surface on which the colored films are formed; and
 irradiating the entire surface with light from the substrate face on which the colored films are not formed, to form a black matrix comprising a black curing resin or resist in a part in which the colored films are not formed.

13. The color filter fabricating method according to claim 12, wherein the entire surface of the black matrix is irradiated with light during forming of a last film.

14. The color filter fabricating method according to claim 12, wherein defects of a film pattern is compensated for by applying only a voltage during forming of the last film on the black matrix.

15. The color filter fabricating method according to claim 1, wherein a black matrix is formed on the color filter forming substrate, using an electrodeposition liquid or electrolyte for forming a black matrix, and then the colored film is formed.

16. The color filter fabricating method according to claim 15, wherein the entire surface of the colored films of plural colors is irradiated with light during forming of a last film.

17. The color filter fabricating method according to claim 15, wherein defects of a film pattern is compensated for by applying only a voltage during forming of the last film on the colored films of plural colors.

18. The color filter fabricating method according to claim 1, wherein the polymeric material is a copolymer of monomers respectively having hydrophobic groups, hydrophilic groups, and cross-linkable groups, and the ratio of the number of hydrophobic groups to the total number of hydrophobic groups and hydrophilic groups is between 30% and 80%.

19. The color filter fabricating method according to claim 1, wherein the transparent high-dielectric material is an oxide semiconductor.

20. The color filter fabricating method according to claim 19, wherein the oxide semiconductor is titanium oxide.

21. The color filter fabricating method according to claim 20, wherein the particle diameter of the titanium oxide is 20 nm or less.

22. The color filter fabricating method according to claim 1, wherein the volume ratio of a mixture of the high-dielectric material and colorant and the polymeric material is 1 to 5.0 or less.

23. A color filter fabricating method, comprising the steps of:
    placing a color filter forming substrate formed by arraying thin film transistors and transparent conductive films on a transparent substrate and providing thin semiconductor films on the conductive films so that at least the thin semiconductor films of the color filter forming substrate contact an aqueous electrodeposition liquid which contains a colorant, a transparent, high-dielectric material having a particle diameter of 100 nm or less, and a polymeric material that has cross-linkable groups in molecules and decreases in solubility and dispersibility for an aqueous liquid, depending on a change in pH;
    in this state, irradiating a thin semiconductor film of a selected region with light to apply a voltage between the thin semiconductor film and an opposing electrode; and
    depositing a high-dielectric colored film in the thin semiconductor film of the selected region.

24. The color filter fabricating method according to claim 23, wherein an application voltage is set to 5V or less by adding acid or alkali exerting no influence on electrodeposition characteristics to the electrodeposition liquid to control pH in the solution.

25. The color filter fabricating method according to claim 23, wherein electrodeposition speed is kept constant by adjusting the temperature of the electrodeposition liquid.

26. The color filter fabricating method according to claim 23, wherein an organic alkali material is used when the electrodeposition liquid is prepared.

27. The color filter fabricating method according to claim 23, wherein an ammonium salt is used when the electrodeposition liquid is prepared.

28. A color filter fabricating method, comprising the steps of:
    placing a color filter forming substrate formed by providing a transparent conductive thin film and a transparent thin semiconductor film in contact with the conductive film on a transparent substrate, the conductive film being conductible to an electrolyte so that the thin semiconductor film contacts an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH;
    bringing the conductive film into conduction with the electrolyte;
    in this state, irradiating a selected region of the thin semiconductor film with light; and
    depositing a high-dielectric colored film in the thin semiconductor film of the selected region.

29. The color filter fabricating method according to claim 28, wherein an application voltage is set to 5V or less by adding acid or alkali exerting no influence on electrodeposition characteristics to the electrolyte to control pH in the solution.

30. The color filter fabricating method according to claim 28, wherein electrodeposition speed is kept constant by adjusting the temperature of the electrolyte.

31. The color filter fabricating method according to claim 28, wherein an organic alkali material is used when the electrolyte is prepared.

32. The color filter fabricating method according to claim 28, wherein an ammonium salt is used when the electrolyte is prepared.

33. A color filter fabricating method, comprising the steps of:
    placing a color filter forming substrate formed by arraying thin film transistors and transparent conductive films on a transparent substrate and providing transparent thin semiconductor films in contact with the conductive films so that a part of the conductive film is exposed so that at least the conductive films and the thin semiconductor films contact an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH;
    irradiating the thin semiconductor film of a selected region with light; and
    depositing a high-dielectric colored film in the thin semiconductor film of the selected region.

34. A color filter fabricating method, comprising the steps of:
    placing a color filter forming substrate formed by arraying thin film transistors and transparent conductive films on a transparent substrate and transparent thin semiconductor films in contact with the conductive films so that a part of the conductive films is exposed so that at least the conductive films and the thin semiconductor films contact an aqueous electrolyte which contains a colorant, a transparent, high-dielectric material having a particle diameter of 100 nm or less, and a polymeric material that has cross-linkable groups in molecules and decreases in solubility and dispersibility for an aqueous liquid, depending on a change in pH;
    selectively driving a predetermined thin film transistor;
    in this state, irradiating the entire surface of the color filter forming substrate with light; and
    depositing a high-dielectric colored film in a thin semiconductor film corresponding to a thin film transistor not driven.

* * * * *